United States Patent [19]
Daman

[11] 3,757,853
[45] Sept. 11, 1973

[54] HEAT-EXCHANGER FOR POWER PLANTS, ESPECIALLY MOTOR VEHICLES

[75] Inventor: Leonard Salisbury Daman, Cedar Falls, Iowa

[73] Assignee: Deere & Company, Moline, Ill.

[22] Filed: June 12, 1972

[21] Appl. No.: 261,696

[52] U.S. Cl. ............................................. 165/76
[51] Int. Cl. ........................................... F28f 7/00
[58] Field of Search .................. 165/43, 51, 76–78, 165/140,8; 62/239; 98/12–13

[56] References Cited
UNITED STATES PATENTS

| | | | |
|---|---|---|---|
| 1,525,437 | 2/1925 | Berman | 165/76 |
| 2,264,820 | 12/1941 | Young | 165/140 X |
| 2,378,351 | 6/1945 | Young | 165/140 X |
| 2,397,069 | 3/1946 | Young et al. | 165/140 X |
| 3,315,731 | 4/1967 | Jensen et al. | 165/51 |

Primary Examiner—Charles J. Myhre
Assistant Examiner—Theophil W. Streule, Jr.
Attorney—H. Vincent Harsha, William A. Murray et al.

[57] ABSTRACT

In a motor vehicle, for example, having the usual coolant radiator, a second heat exchanger is mounted ahead of the radiator and carried thereby for sliding removal and replacement.

10 Claims, 5 Drawing Figures

PATENTED SEP 11 1973

HEAT-EXCHANGER FOR POWER PLANTS, ESPECIALLY MOTOR VEHICLES

BACKGROUND OF THE INVENTION

It is typical in power plant installations, especially motor vehicles, to mount a second heat exchanger on—usually ahead of—the conventional coolant radiator so that air flows through the two exchangers in series. The problem to be solved lies in improving the means whereby the second heat exchanger may be more easily serviced; e.g., removed from and replaced in its normal position. Conventionally, the second exchanger may be a part of a secondary liquid system, such as a transmission oil cooler, air-conditioning condensor, etc. The problem is particularly acute where the surrounding structure associated with the engine, such as hood, side panels, etc. interfere with removal and replacement of the second exchanger. Also, the exchanger is quite heavy and is not easily maneuvered into and out of place.

SUMMARY OF THE INVENTION

According to the present invention, the mounting and dismounting of the second exchanger is accomplished by track means which affords a sliding movement, thereby supporting the weight of the exchanger during removal and replacement. Also, the improved means is simple and economical to construct, preferably comprising pairs of cooperative tubular or part tubular elements, one of which may be internally threaded to receive cap screws or equivalent fasteners. Preferably, the tracks are upper and lower tracks to more readily carry the weight of the exchanger during removal and replacement.

DESCRIPTION OF A PREFERRED EMBODIMENT

Figure 1:
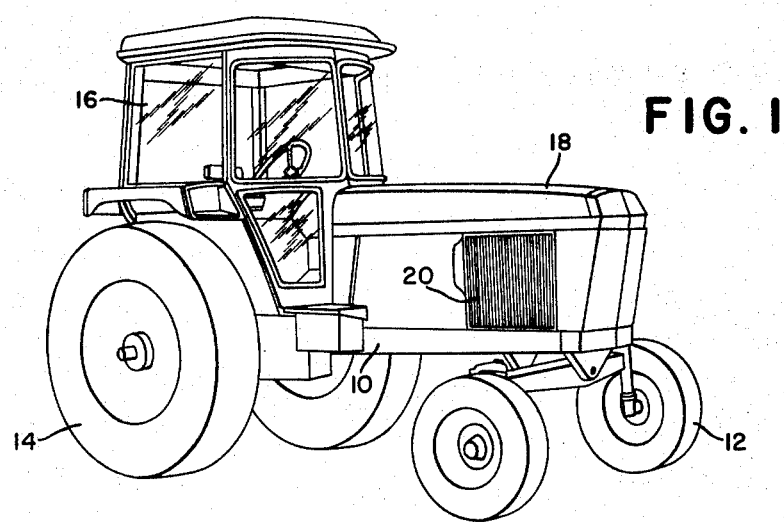
FIG. 1 is a perspective of a typical agricultural tractor in which the invention finds utility.

FIG. 1 is a typical of an agricultural vehicle selected as a representative background for an explanation of the invention. The tractor shown there has a main body 10 supported on front wheels 12 and rear wheels 14 and includes a rear driver's cab 16 and a forward engine hood structure 18, the latter of which is enclosed in part by removable side panels 20.

Figure 2:
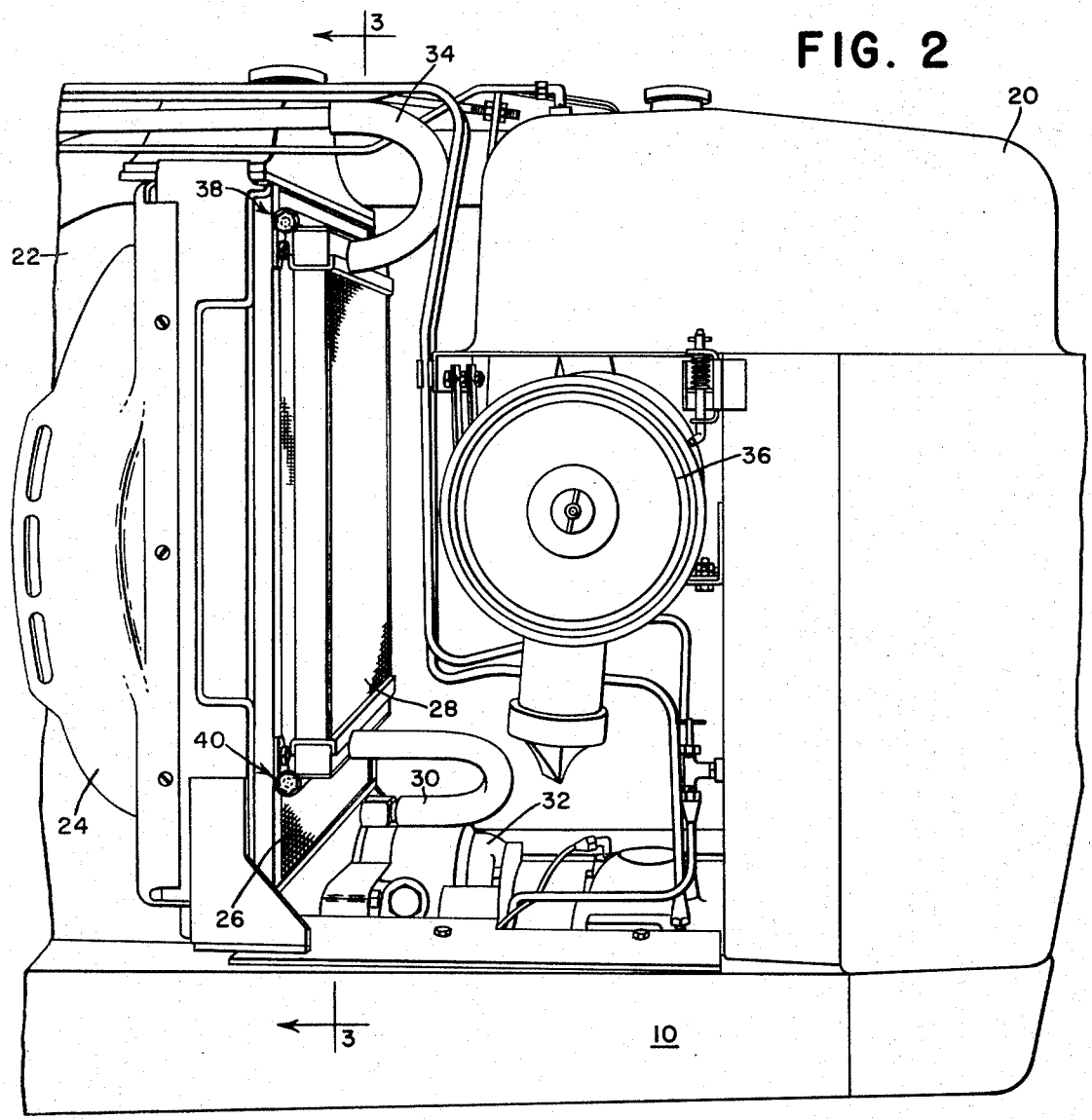
FIG. 2 is an enlarged fragmentary view of a front portion of the structure associated with the engine and showing the radiator and secondary exchanger.
Figure 3:
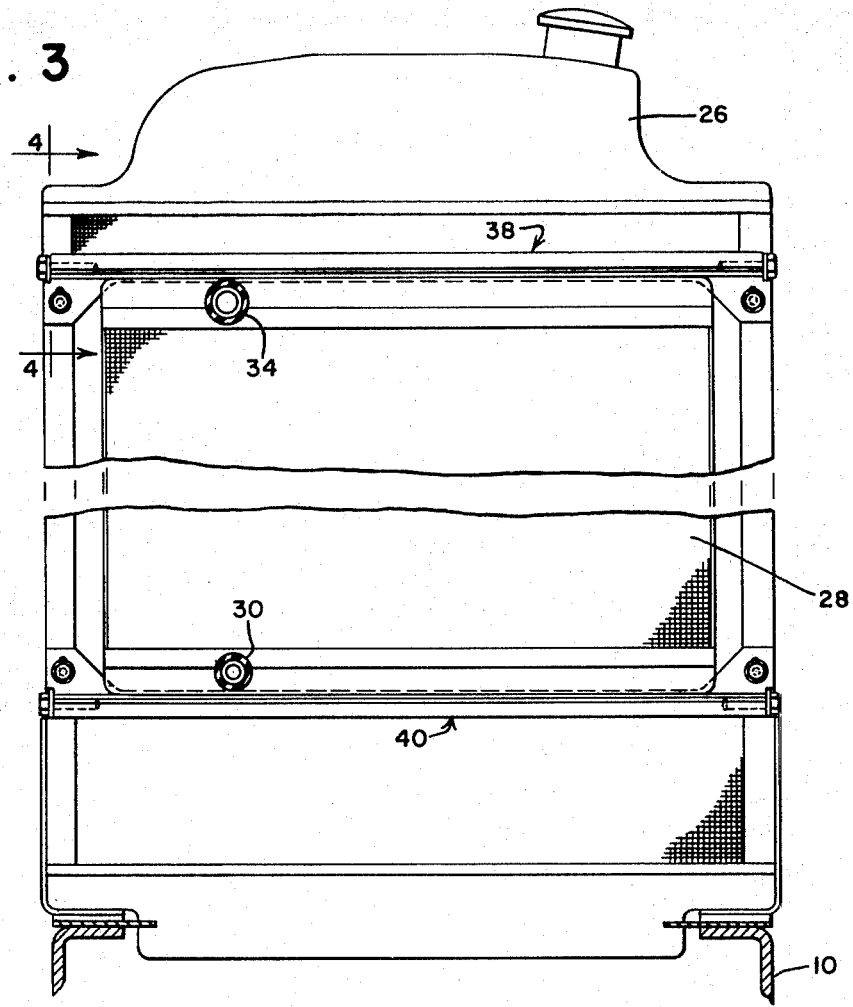
FIG. 3 is a view as seen generally along the line 3—3 of FIG. 2.
Figure 4:
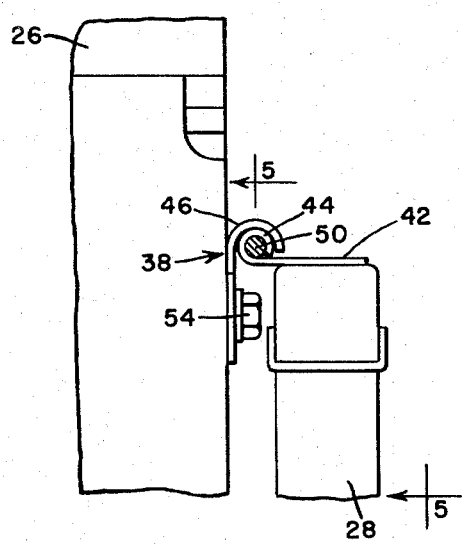
FIG. 4 is a fragmentary view as seen along the line 4—4 of FIG. 3.
Figure 5:
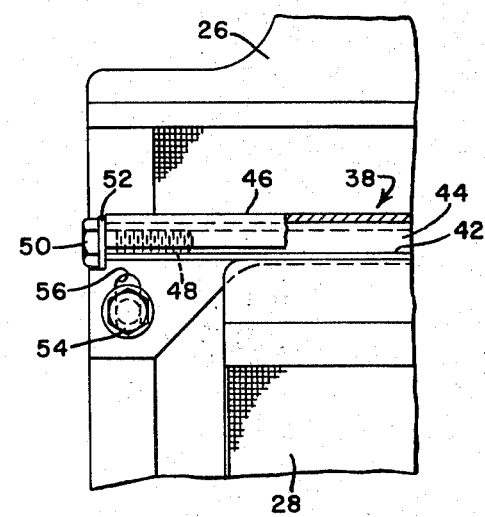
FIG. 5 is a partial view, with portions in section, as seen along the line 5—5 of FIG. 4.

FIG. 2 illustrates portions of the structure that are visible upon removal of the hood and side panels. Forwardmost is a fuel tank 20, and spaced to the rear of that is an internal-combustion engine 22 having associated structure including the usual engine fan (not shown) partly enclosed in a typical fan shroud 24. A first exchanger 26, here the engine coolant radiator for the liquid-cooled engine, is disposed in an upright position ahead of the fan, and a second exchanger 28 is disposed in juxtaposed relation to and, here, ahead of the radiator, so that air flow created by the engine fan is drawn through the two exchangers in series, it being noted that the panels 20 are perforate.

In the particular environment here, the exchanger 28 is a transmission oil cooler, having a lower conduit connection 30 to a lubricant pump 32 and an upper conduit connection 34 that leads to the transmission oil sump (not shown). The exchanger could be of some other type and for some other purpose. Also visible in FIG. 2 are an air cleaner 36 and other lines and components not important to the invention except as an indication of the limited availability of space for the exchanger 28. In the usual situation, it is preferred to remove one side panel 20, leaving the upper part of the hood in place, when it is desired to service the exchanger 28. This means that the exchanger must be removed and replaced along a path transverse to the length of the vehicle, besides which the exchanger is quite heavy. Consequently, simple removable means such as nuts and bolts are not satisfactory.

The mounting means comprises a pair of—here upper and lower—track means 38 and 40 arranged in horizontal parallelism. Because the two means are the same, a detailed description of one will suffice for the other. The upper means is shown in detail.

The upper means includes an elongated element 42 securely fastened to the top of the exchanger 28, preferably in the form of a metal strip having a rolled portion 44 that forms essentially a tube. Each of these elements extends completely across the exchanger. The radiator 26 carries, as its cooperative track element, a member 46 of inverted J-shape, the partial roll of which complements and receives the tubular element 44 in transversely sliding relation. Similar elements are visible at the bottom of the two exchangers, which will be clear without further elaboration.

Each of the opposite ends of the rolled or tubular portion 44 is internally threaded at 48 to receive a threaded fastener in the form of a cap screw 50 which has a washer 52 abutting the outside end of the element 46. There are four such cap screws, and when these are securely tightened, the two exchangers are held rigidly together. Each member or element 46 is mounted on the front of the radiator 26 by cap screws or equivalent fasteners 54, and the depending part of each element 46 is slotted vertically at 58 to provide a limited range of adjustability so as to enable the track elements to be relatively adjusted and thus to improve the sliding arrangement between the two.

Removal of the exchanger 28 involves only the removal of the side panels 20 without disturbing the hood 18 and associated components. The cap screws 50 at one end of the tubular elements 44 are removed and the exchanger 28 may be slid easily out of the opposite side opening of the tractor. Removal may be accomplished from either side. Replacement is simply a reversal of the foregoing.

I claim:

1. A heat-exchange system for a power plant installation, especially for a motor vehicle, including a liquid-cooled internal-combustion engine, a first heat-exchanger associated with the engine and through which engine coolant circulates, a second liquid-circulating means associated with the installation, a second heat-exchanger through which secondary means liquid circulates and disposed in juxtaposed relation to the first exchanger so that air passes through the exchangers in series, and means detachably mounting one exchanger relative to the other, characterized in that the mounting means comprises track means slidably supporting the one exchanger relative to the other for movement into and out of said juxtaposed relation, and releasable securing means cooperative with the track means for normally securing the exchangers in said juxtaposed relation.

2. The invention defined in claim 1, further characterized in that the track means includes spaced apart pairs of cooperative track elements.

3. The invention defined in claim 2, further characterized in that one element of each pair includes a tubular portion and the cooperative element of each pair includes a complementarily shaped portion and the releasable means for each pair includes a fastener removably carried by one element and engageable normally with the cooperative element.

4. The invention defined in claim 3, further characterized in that each tubular element is elongated along the length of the track means and has opposite internally threaded end parts, and each fastener is externally threaded to fit removably into the respective end parts.

5. The invention defined in claim 2, further characterized in that the elements of each pair are relatively adjustable in order to improve the sliding relationship between the exchangers.

6. The invention defined in claim 2, further characterized in that the exchangers are disposed in parallel vertical planes and the track elements are upper and lower pairs.

7. The invention defined in claim 6, further characterized in that the first exchanger is vertical and is mounted ahead of the engine, the second exchanger is vertical and is mounted ahead of the first exchanger, one element of each pair is carried on the first exchanger in spaced apart parallel relationship and the other elements of the pair are carried on the second exchanger.

8. The invention defined in claim 7, further characterized in that the elements on the first exchanger are detachably and adjustably mounted.

9. The invention defined in claim 7, further characterized in that the second exchanger elements are each in the form of a strip having a rolled portion proximate to the first exchanger and parallel thereto and each element on the first exchanger is a J-shaped element cooperatively fitting the respective rolled portion.

10. The invention defined in claim 9, further characterized in that each of the opposite ends of each rolled portion is internally threaded and each fastener is a cap screw threaded into the associated rolled portion and abutting the respective end of the associated J-shaped portion.

* * * * *